Patented May 2, 1939

2,156,904

UNITED STATES PATENT OFFICE 2,156,904

MANUFACTURE OF GEL-TYPE METALLIC OXIDE CATALYSTS

Robert F. Ruthruff, Nutley, N. J., assignor to Process Management Company, Inc., New York, N. Y., a corporation of Delaware No Drawing. Application December 21, 1937, Serial No. 180,941

4 Claims. (Cl. 23—233)

This invention relates to the preparation of catalytic materials and more particularly to the preparation of catalysts of the so-called oxide gel type from metal salts having the ability to peptize the oxide, hydroxide, or hydrous oxide of the metal. Still more particularly the invention relates to the production of chromium oxide catalysts of high catalytic activity.

In the preparation of a metallic oxide catalyst, such as the oxides of iron, aluminum, copper, cobalt, nickel and chromium by the method which involves the precipitation of the corresponding hydroxide as a gelatinous mass it is common practice to carry out the precipitation in dilute solution with slow addition of the reagent because metallic hydroxide precipitates formed in concentrated solution adsorb salts so strongly that it is practically impossible to remove them by subsequent washing and because rapid precipitation of the hydroxide in a dilute solution results in the formation of a non-gelatinous precipitate which is unsuitable for the preparation of an active catalyst. For example, in preparing chromium oxide catalysts by this method it is customary to precipitate the hydroxide from a dilute solution of a salt of chromium, for example, a 0.1 normal chromium nitrate solution, by the slow addition of slightly more than the theoretical amount of dilute ammonium hydroxide, for example, 0.1 normal ammonia solution. Usually, when about half the required amount of hydroxide reagent has been added the solution is stirred for several hours, before introducing the remainder, to condition the solution.

It is an object of the present invention to provide a method whereby metallic oxide catalysts may be prepared by the precipitation of the corresponding oxide, hydroxide or hydrous oxide as a gelatinous mass in a dilute solution with substantially less expenditure of time and energy than in the prior practice as outlined above.

In the following description and claims the gelatinous precipitate, from which the catalyst may be made by washing and drying, is referred to as an hydroxide of the metal. It is to be understood, however, that the invention is not limited by such terminology. In many cases the exact nature of the precipitate formed is not known, but it appears that the precipitates obtained from different metals differ in composition, some of them being the oxide itself, others the oxide with a definite amount of water of composition, i. e., the hydroxide, while others are oxide holding a large but indefinite amount of water. It is to be understood, therefore, that expressions below, such as "hydroxide reaction product", refer to gelatinous precipitates obtained by the method of the invention regardless of their exact composition as oxides, hydroxides, or hydrous oxides.

In the present invention the reaction of the metallic salt and the hydroxide precipitant is carried out in a concentrated solution until the amount of unreacted metallic salt is insufficient to peptize additional hydroxide reaction products and thereafter precipitation of the hydroxide as a gelatinous mass is effected in a dilute solution.

In accordance with this method aqueous solutions of the metallic salt and the hydroxide precipitant are mixed by the rapid progressive addition of the latter to the former. The concentrations of these solutions are regulated to produce a resulting solution wherein the concentration of the unreacted metallic salt is sufficient to effect rapid peptization of the metallic hydroxide reaction product until substantially all the metallic salt has been converted to said reaction product. The progressive addition of the hydroxide reagent to the solution under these conditions is continued until the unreacted metallic salt is no longer able to peptize the hydroxide reaction product formed and any further addition of the reagent will cause precipitation. Thereafter the concentration of the metallic hydroxide solution and of the reagent being added is regulated whereby on further addition of the reagent precipitation of the metallic hydroxide product is effected in a solution in which the concentration of soluble salts is insufficient to effect substantial adsorption thereof by the said precipitate. In the first stage, in which the solution is relatively concentrated, the addition of the reagent may be effected relatively rapidly with stirring whereas in the second stage, wherein the solution is relatively diluted, the addition of the reagent is carried out more slowly with stirring.

The regulation of the concentration of the reagents in the first stage of the process may be effected by employing one or both as concentrated solutions. Preferably, both are concentrated since this hastens the process by permitting more rapid addition of hydroxide reagent due to the fact that the concentration of the unreacted salt is sufficient to effect rapid peptization of the metallic hydroxide product. The exact concentrations of the reagents employed will depend upon convenience and the nature of the reagents but it will be apparent that it is advantageous to employ relatively concentrated solutions of each since in this manner the advantages of the invention are realized to the fullest degree.

The regulation of the concentration of the solution in the second stage may be effected by diluting the colloidal metallic hydroxide solution or the reagent which is being added thereto, or both. Here again, convenience and the nature of the reagents employed may vary somewhat the degree of dilution employed. Where it is desired to obtain precipitates which are free from adsorbed salts it is necessary to effect the precipitation in a relatively dilute solution. Under these circumstances it is desirable to effect substantial dilution of the metallic hydroxide solution and the solution of the reagent being added prior to further addition of the reagent.

Any soluble salt of the metal whose oxide is desired may be employed for the process of the invention, and any suitable hydroxide reagent may be employed, such as ammonium, sodium, and potassium hydroxide. Preferably, however, in the formation of the hydroxides of chromium, iron, and aluminum, ammonium hydroxide should be employed; while in the formation of the hydroxides of copper, cobalt, and nickel, sodium hydroxide is preferred.

In its preferred form the invention employs in the first stage a relatively concentrated solution of a salt of the metal of the oxide catalyst desired and a concentrated solution of the hydroxide reagent, for example, a molar solution of the salt and a concentrated hydroxide solution. The concentrated hydroxide solution is added to the metallic salt solution rapidly with stirring to the maximum amount possible without forming a permanent precipitate. Thereafter the metallic hydroxide solution is diluted substantially with water and a relatively dilute solution of the reagent, for example, 0.1 normal solution, is added more slowly with stirring to effect precipitation of the metallic hydroxide as a gelatinous mass. The amount of the reagent which may be added in the concentrated form will vary in accordance with the nature of the salt and the precipitant employed. For example, over 70% of the theoretical amount of ammonia necessary to effect precipitation may be added rapidly in the concentrated form when concentrated chromium nitrate solutions are employed, while with concentrated solutions of ferric chloride 90% of the theoretical amount of ammonia may be added rapidly in the concentrated form, without forming a permanent precipitate.

*Example*

To a molar solution of chromium nitrate there is added rapidly with stirring concentrated ammonium hydroxide, for example, 28% ammonia solution, to a point just short of that at which a permanent precipitate forms. Over 70% of the ammonia necessary to effect precipitation of the metal as an hydroxide may be added in this manner. If a small amount of permanent precipitate is formed it may be destroyed by adding a few drops of the appropriate acid. At this point the solution is diluted by the addition of water in an amount sufficient to decrease the chromium content to 0.1 to 0.2 normal, and .066 molar ammonium hydroxide solution is added slowly with stirring to effect the precipitation of the hydroxide as a gelatinous mass. The resulting precipitate is washed several times with water to effect removal of the small amount of adsorbed salts, the wash water being removed by decantation. The precipitate is then filtered, dried slowly, for example at 100° C. overnight, and then heated for several hours, for example, at 250° C. to complete the drying.

A ferric hydroxide gelatinous precipitate of the desired character may be prepared from a molar solution of ferric chloride by the method described in the above example. It will be found, however, that a much larger proportion of the total ammonium hydroxide necessary may be added prior to dilution. Approximately 90% of the theoretical amount may be added without forming a permanent precipitate.

The above example relating to the formation of chromium oxide and iron oxide catalysts by the method of the present invention illustrates the application of the invention to the production of these particular catalysts. It is to be understood, however, that the invention is not limited by such specific illustrations but is applicable to the production of other metallic oxide catalysts of this type with such slight modifications as would occur to those skilled in the art.

I claim:

1. In the preparation of catalysts of the metallic oxide gel type by the reaction of a metallic salt and a readily soluble hydroxide in aqueous solution to precipitate the hydroxide of the metal as a gelatinous mass, the steps comprising rapidly mixing aqueous solutions of the metallic salt and the hydroxide reagent by progressive addition of the latter to the metallic salt solution, regulating the concentrations of said solutions to produce a resulting solution in which the concentration of unreacted metallic salt is sufficient to effect rapid peptization of the metallic hydroxide reaction product, continuing the said addition rapidly with agitation of the mixture until the unreacted metallic salt is insufficient to peptize additional metallic hydroxide reaction product, thereafter regulating the concentrations of the hydroxide reagent and the resulting solution whereby on continued addition of the said reagent the resulting precipitate is brought down in a diluted solution in which the concentration of soluble salts is insufficient to effect the substantial adsorption thereof by said precipitate, continuing said addition after said last-mentioned regulation slowly with agitation to effect precipitation of the metallic hydroxide as a gelatinous mass, separating said precipitate from said solution, and drying the precipitate to form a vitreous metallic oxide catalyst.

2. In the preparation of catalysts of the metallic oxide gel type by the reaction of a metallic salt and a readily soluble hydroxide in aqueous solution to precipitate the hydroxide of the metal as a gelatinous mass, the steps comprising rapidly mixing concentrated aqueous solutions of the metallic salt and the hydroxide reagent by progressive addition of the latter to the metallic salt solution to produce a resulting solution in which the concentration of unreacted metallic salt is sufficient to effect rapid peptization of the metallic hydroxide reaction product, continuing the said addition rapidly with agitation of the mixture until the unreacted metallic salt is insufficient to peptize additional metallic hydroxide reaction product, thereafter diluting the hydroxide reagent and the resulting solution whereby on continued addition of the said reagent the resulting precipitate is brought down in a solution in which the concentration of soluble salt is insufficient to effect substantial adsorption thereof by said precipitate, continuing said addition after said dilution slowly with agitation to effect precipitation of the metallic hydroxide as a gelatinous mass, separating said precipitate from said solution, and drying the precipitate to form a vitreous metallic oxide catalyst.

3. In the preparation of catalysts of the metallic oxide gel type by the reaction of a metallic salt and a readily soluble hydroxide in aqueous solution to precipitate the oxide of the metal as a gelatinous mass, the steps comprising effecting reaction of the hydroxide reagent and the metallic salt in a concentrated solution to form a colloidal solution of the resulting metallic hydroxide reaction product in which the unreacted metallic salt is insufficient to peptize additional hydroxide reaction product, diluting said concentrated solution, thereafter adding hydroxide reagent to said dilute solution to effect precipitation of said metallic hydroxide reaction product as a gelatinous mass in said dilute solution, separating said precipitate from said solution, and drying the precipitate to form a vitreous metallic oxide catalyst.

4. In the preparation of a chromium oxide gel catalyst the steps comprising rapidly adding concentrated ammonium hydroxide to a molar solution of chromic nitrate with stirring, continuing the said mixing rapidly with agitation of the mixture to effect addition to the solution of approximately 70% of the ammonia required to precipitate the metal as the hydroxide, diluting said solution by the addition of water in an amount sufficient to decrease the chromium content thereof to 0.1 to 0.2 normal, adding to said diluted solution slowly with agitation dilute ammonium hydroxide to precipitate chromium hydroxide as a gelatinous mass, separating said precipitate from said solution, and drying the precipitate to form a black vitreous chromium oxide catalyst.

ROBERT F. RUTHRUFF.